United States Patent
Berthold et al.

(10) Patent No.: US 6,759,021 B1
(45) Date of Patent: Jul. 6, 2004

(54) METHOD AND DEVICE FOR INTRODUCING A GASEOUS REDUCING AGENT OF A NITROGEN OXIDE INTO A GAS MIXTURE

(75) Inventors: Thomas Berthold, München (DE); Gabriele Preu, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,587

(22) PCT Filed: Apr. 3, 2000

(86) PCT No.: PCT/DE00/01018
§ 371 (c)(1),
(2), (4) Date: Oct. 30, 2001

(87) PCT Pub. No.: WO00/66252
PCT Pub. Date: Nov. 9, 2000

(30) Foreign Application Priority Data

Apr. 30, 1999 (DE) .......................................... 199 19 914

(51) Int. Cl.[7] .............................................. B01D 53/56
(52) U.S. Cl. .................... 423/235; 423/239.1; 423/358; 422/109; 422/168; 422/172
(58) Field of Search .............................. 423/235, 239.1, 423/358; 422/109, 168, 172

(56) References Cited

U.S. PATENT DOCUMENTS

| | | | |
|---|---|---|---|
| 4,731,231 A | 3/1988 | Perry | 423/239.1 |
| 5,809,775 A | 9/1998 | Tarabulski et al. | 274/274 |
| 6,266,955 B1 * | 7/2001 | Liang et al. | 60/274 |

FOREIGN PATENT DOCUMENTS

| | | | |
|---|---|---|---|
| DE | 42 00 514 A1 | 7/1993 | |
| EP | 0 615 777 A1 | 9/1994 | |
| EP | 0 848 985 A1 | 6/1998 | |
| EP | 0 878 608 A2 | 11/1998 | |
| JP | 02258017 A * | 10/1990 | B01D/53/36 |
| WO | WO 99/29432 | 6/1999 | |

* cited by examiner

Primary Examiner—Stanley S. Silverman
Assistant Examiner—Maribel Medina
(74) Attorney, Agent, or Firm—Young & Thompson

(57) ABSTRACT

A method for introducing at least one gaseous reducing agent for a nitrogen oxide into a gas mixture, and a device for carrying out the method. Thermal energy is supplied to a body made from a starting material of the reducing agent, so as to form the reducing agent. The starting material used is urea. The reducing agent formed is ammonia. This method is used in particular to reduce nitrogen oxides in the exhaust gas from internal-combustion engines.

27 Claims, 2 Drawing Sheets

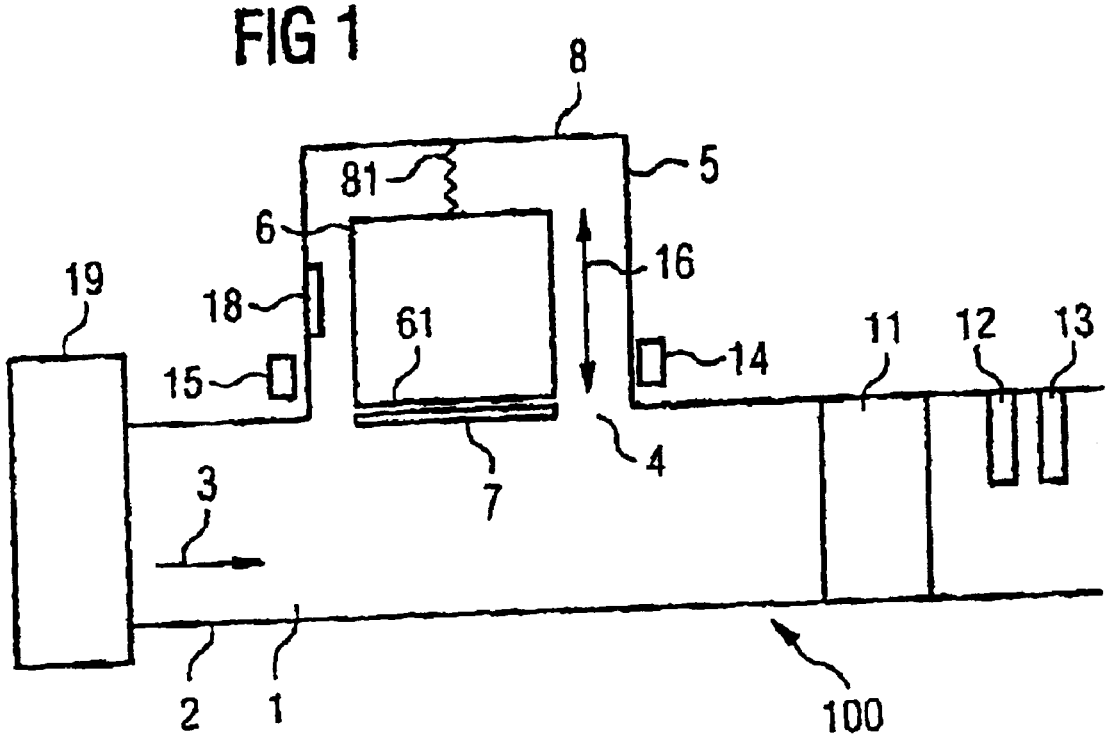
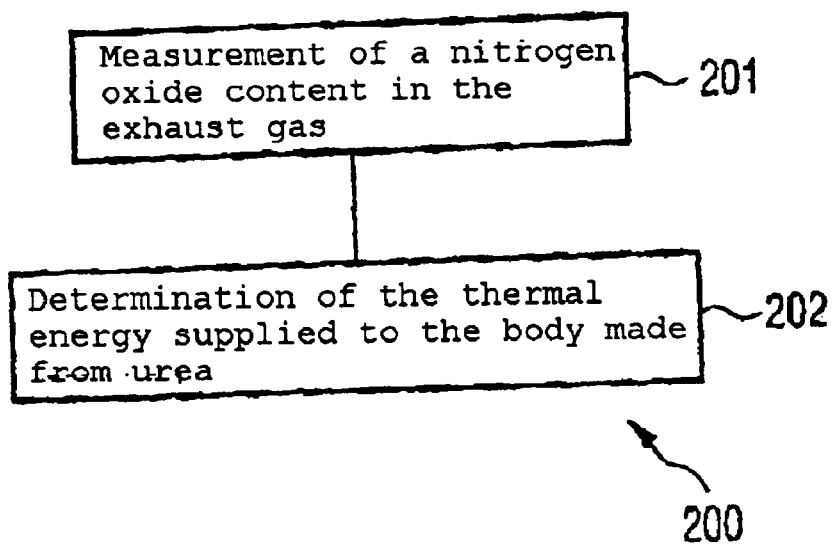

METHOD AND DEVICE FOR INTRODUCING A GASEOUS REDUCING AGENT OF A NITROGEN OXIDE INTO A GAS MIXTURE

BACKGROUND OF THE INVENTION

The invention relates to a method for introducing at least one gaseous reducing agent for a nitrogen oxide into a gas mixture, thermal energy being supplied to at least one solid starting material of the reducing agent, so as to form the reducing agent, and the reducing agent and the gas mixture being brought into contact with one another. A method of this type is known, for example, from U.S. Pat. No. 4,731,231. As well as the method, the invention provides a device for carrying out the method.

The combustion of a fossil energy carrier in the presence of air involves the formation of the undesirable byproduct nitrogen oxide. With a view to making the combustion environmentally friendly, it is desirable to suppress the formation of nitrogen oxide or to subsequently remove nitrogen oxides from an exhaust gas from the combustion. Subsequent removal of the nitrogen oxides is achieved, for example, by admixing a reducing agent for the nitrogen oxides with the exhaust gas. In the method which is known from U.S. Pat. No. 4,731,231, cyanuric acid is introduced into the exhaust gas as reducing agent. On a surface of a catalytic converter, the cyanuric acid reacts with nitrogen oxide to form molecular nitrogen and carbon dioxide. According to this method, the reducing agent (cyanuric acid) is obtained through sublimation of a solid starting material of the reducing agent, for example cyanuric acid. The cyanuric acid is prepared in a heatable vessel.

For effective reduction of nitrogen oxide, it is necessary to introduce into the exhaust gas a quantity of reducing agent which corresponds to a level of nitrogen oxide in the exhaust gas.

SUMMARY OF THE INVENTION

It is an object of the invention to provide a method for introducing a gaseous reducing agent for nitrogen oxides into a gas mixture, in which the amount of reducing agent which is to be introduced into the gas mixture can be adjusted in a simple way.

To achieve the object, the invention provides a method for introducing at least one gaseous reducing agent for a nitrogen oxide into a gas mixture, thermal energy being supplied to at least one solid starting material of the reducing agent, so as to form the reducing agent, and the reducing agent and the gas mixture being brought into contact with one another, characterized in that the thermal energy is supplied to at least one body made from the starting material.

The gas mixture is, for example, the exhaust gas from an internal-combustion engine, in particular a diesel or spark-ignition engine. The gas mixture may also be the off-gas from a fossil-fired powerplant.

The gaseous reducing agent, is, for example, ammonia. Ammonia has the advantage that it reacts (in the presence of a catalyst) with nitrogen oxides to form molecular nitrogen. The only byproduct formed is carbon dioxide.

One example of a starting material of the reducing agent is urea. Urea liberates ammonia at a temperature which lies above the melting point of the urea. The only byproduct of hydrolysis of the urea (decomposition in the presence of water, which is automatically present in the exhaust gas from an internal-combustion engine) is carbon dioxide. To this extent, urea can be regarded as an ideal starting material for ammonia. However, urea is hygroscopic and there are therefore restrictions on its storage.

A hygroscopic property of a material can be diminished by reducing a reactive surface area of the material for the absorption of water. Therefore, the starting material is provided in the form of a body. In particular, a body with a compacted starting material is used. The body consists, for example, of a compressed powder of the starting material. Melted-down starting material is also conceivable. The starting material may also be embedded in a solid matrix. The material of the matrix is preferably hydrophobic. Moreover, it should be easy to convert the material into environmentally friendly reaction products.

In a particular configuration of the invention, the thermal energy is provided by a means for controlling the temperature of the body. The thermal energy is supplied to a surface of the body. In particular, the thermal energy is supplied with the aid of a temperature-controllable holding device for the body by thermal conduction.

By way of example, it is also possible to supply the thermal energy by convection or thermal radiation. In a further configuration, the thermal energy is provided by the gas mixture.

In a particular configuration of the method, a surface of the body at which the formation of the reducing agent takes place and the gas mixture are brought into contact with one another. By way of example, the exhaust gas from the internal-combustion engine flows within an exhaust pipe. The flowing gas mixture, which has been heated by the combustion, is guided past the body. The temperature of the gas mixture fluctuates, for example, between 350° and 600° C. These temperatures are sufficient to liberate ammonia from urea. In this configuration, the thermal energy is provided through convection by the gas mixture.

In a further configuration, the temperature-control means functions as a catalyst for the formation of the reducing agent. By way of example, the temperature-control means is a device for holding the body comprising the starting material. The holding device functions, for example, as a hydrolysis catalyst for urea.

In a particular configuration, ammonia is formed as reducing agent in the method. Aliphatic ammonia derivatives (amines) are also conceivable. In particular, the starting material of the reducing agent used is urea. Other starting materials, such as for example ammonium carbonate, ammonium carbamate, ammonium hydrogen carbonate, ammonium formate, ammonium oxalate, ammonium hydroxide, cyanuric acid, urea-formaldehyde, melamine and mixtures of these compounds.

In particular, a body which consists of a compacted starting material is used in the method. This is, for example, a compressed powder of the starting material or the starting material in melted-down form, in which case the body is formed through solidification of a melt in a mold or on a device for dissipation of heat. A body of this type has a less hygroscopic nature than pulverulent, loose starting material. The body can be stored successfully.

To carry out this method in practice, it is also advantageous to monitor the amount of starting material which is present. Monitoring takes place, for example, with the aid of a light barrier which indicates a filling level of the starting material or a size of the body made from the starting material.

In a particular configuration of the method, the body is pressed against the holding device. This ensures that the body is in constant contact with the means for controlling the temperature of the body. In particular, in the method a level of nitrogen oxide in the gas mixture is measured, and a quantity of thermal energy is supplied as a function of this level. This ensures that as much nitrogen oxide as possible is broken down. At the same time, this prevents excessive quantities of reducing agent, which could pollute the environment, from being released. The level of nitrogen oxide is determined, for example, using a gas sensor.

The quantity of thermal energy is determined, for example, by means of a heating output of the temperature-control means.

In a further configuration of the invention, it is also possible to cool the body comprising the starting material. By way of example, the body is heated by the exhaust gas from the internal-combustion engine to such an extent that too much reducing agent is liberated. By cooling the body, therefore, it is possible to reduce or regulate the amount of starting material which is converted. The cooling is effected, for example, by a Peltier element connected to the temperature-control means or by an increased supply of air. It is therefore possible to achieve optimum reduction of the level of nitrogen oxide in any phase of operation of an internal-combustion engine.

The introduction of gaseous reducing agent into the gas mixture can also be influenced by an additional gas flow, for example by means of compressed air.

The method described is carried out in particular for the purpose of introducing the reducing agent into the exhaust gas from an internal-combustion engine.

As indicated above, an internal-combustion engine of this type is in particular a diesel or spark-ignition engine. However, this method can also be used for the reduction of nitrogen oxides in the off-gas from a power plant. Moreover, the method is not restricted to internal-combustion engines fired with fossil energy carriers. Nitrogen oxide may also be formed in an internal-combustion engine in which, for example, hydrogen is oxidized by atmospheric oxygen. Nitrogen oxides in the corresponding exhaust gas are removed in the manner described above.

A further aspect of the invention provides a device for carrying out a method for introducing at least one gaseous reducing agent for a nitrogen oxide into a gas mixture, thermal energy being supplied to at least one solid starting material of the reducing agent, so as to form the reducing agent, and the reducing agent and the gas mixture being brought into contact with one another. The device, which is suitable in particular for carrying out the method described above, is characterized in that a body made from the starting material and a means for controlling the temperature of the body are arranged against one another.

The temperature-control means is, for example, a temperature-controllable holding device for the body. The holding device has in particular a resistance heating element.

In a particular configuration, the temperature-control means has at least one opening for the reducing agent. The reducing agent passes through this opening into the gas mixture. The means is, for example, a metal plate with a plurality of holes.

In a particular configuration, the temperature-control means has at least one coil. The coil may consist of a metal strip or a wire. The coil may also be shaped into a coil screw.

In a further configuration, the temperature-control means has at least one grid or a screen. The grid is, for example, a wire mesh. The wire mesh has, for example, a metal.

In particular, the temperature-control means is inert with respect to the starting material and/or the reducing agent.

The body comprising the starting material is situated, for example, in a vessel. The vessel is attached, directly or indirectly, to a location on the exhaust pipe, a wall of the exhaust pipe having at least one opening at this point. The reducing agent passes through this opening into the exhaust gas. The exhaust pipe may itself be the means for controlling the temperature of the body. The temperature-control means may also be arranged in the opening in the wall of the exhaust pipe.

In particular, the vessel is equipped in such a way that the body comprising the starting material is shielded from ambient air. Water from the ambient air is not absorbed by a possibly hygroscopic starting material. To additionally suppress the hydrophilicity, the vessel may be equipped with a drying agent, such as silica gel. The body itself may also have a drying agent. It is also conceivable for the body to have a hydrophobic layer on its surface.

The device has, for example, a prestressing means for the body. This prestressing means ensures that a defined arrangement of the body on the temperature-control means is ensured. By way of example, the prestressing means is a spring which presses the body against a heatable holding device for the body. The spring is, for example, integrated in a cap of the vessel which contains the body. In this way, the body and the temperature-control means are in constant contact with one another. It should be noted that this is also achieved by utilizing the force of gravity which presses the body onto the temperature-control means.

In a further configuration, the device has at least one means for monitoring the quantity of starting material which is present. This means is in particular a light barrier. The light barrier consists, for example, of a light-emitting photodiode and a photodetector which records the light. When only a certain amount of starting material is left, i.e. when a certain proportion of the body comprising the starting material has been consumed, a signal is generated informing an operator, for example a vehicle driver, of the quantity of starting material which is present. Information may be linked, for example, to a request to "refuel" with the starting material. It is also conceivable for an ignition operation to be interrupted. The consumption of starting material can be accurately determined with the aid of a plurality of means for monitoring the quantity of starting material which is present.

In a further configuration, the device is designed in such a way that mixing of the gaseous reducing agent with the gas mixture is promoted. By way of example, the holding device is positioned in a gas flow of the gas mixture. This leads to turbulence being imparted to reducing agent and gas mixture. The reducing agent may also be introduced via a nozzle or a ventilator.

To summarize, the present invention for introducing a reducing agent for nitrogen oxides has the following advantages associated with it:

A solid starting material of the reducing agent is provided. If an aqueous solution of the starting material were to be introduced, there would be a risk, for example, of a means for metering the starting material, for example a nozzle, becoming blocked by crystallized starting material.

The starting material is used in a form which is not very hygroscopic and is therefore easy to handle.

A simple device which is not prone to defects and is therefore inexpensive is provided.

The reducing agent can be metered easily and accurately.

A method for introducing a gaseous reducing agent into a gas mixture and a device used for this purpose are presented below on the basis of a plurality of exemplary embodiments and the associated drawings. The figures are diagrammatic and not to scale.

BRIEF DESCRIPTION OF THE DRAWINGS

FIG. 1 shows a cross section through a device for introducing a gaseous reducing agent for nitrogen oxides into an exhaust gas from an internal-combustion engine.

FIG. 2 shows a method for introducing a gaseous reducing agent for nitrogen oxides into an exhaust gas.

DETAILED DESCRIPTION OF THE PREFERRED EMBODIMENTS

Figure 3A:
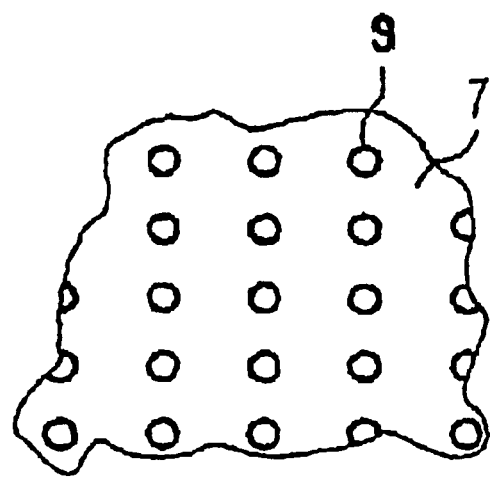
FIGS. 3a to 3c show various embodiments of the means for controlling the temperature of the body.

Nitrogen oxides in the exhaust gas 1 from a diesel engine 19 are reduced with the aid of the method 200 or the device 100. The exhaust gas 1 is passed through an exhaust pipe 2 with a direction of flow 3 (cf. FIG. 1).

In a wall, the exhaust pipe 2 has an opening 4. A vessel 5 is attached to the wall at the location of the exhaust pipe 2 which has the opening 4. The vessel 5 is a tube and has a cap 8 and a drying agent 18 made from silica gel. A cylindrical body 6 of compressed urea is arranged in the vessel 5. In the opening 4 in the exhaust pipe 2 there is a means 7 for controlling the temperature of the body 6. The temperature-control means 7 is simultaneously a holding device for the body 6. The temperature-control means 7 has an electrical resistance heater element. The body 6 is clamped between the means 7 and a cap 8. For this purpose, the cap 8 has a spring 81 which presses the body 6 against the means 7. As a result, the body 6 and the temperature-control means 7 are in constant contact with one another at a surface 61 of the body 6.

The temperature-control means 7 heats the body 6. The body 6 is additionally heated by the exhaust gas 1 flowing past it. As a result of the supply of thermal energy, the urea is converted into ammonia which passes through the holes 9 in the means 7 into the exhaust gas 1.

Figure 3B:
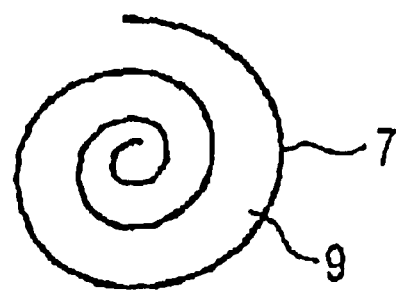
Figure 3C:
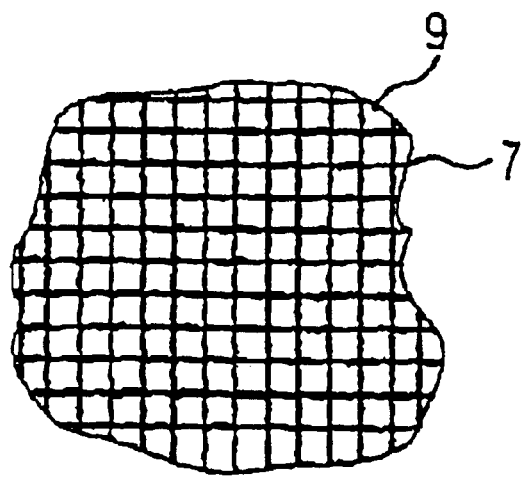

In a first exemplary embodiment, the temperature-control means 7 is a disc with holes 9 (FIG. 3a). In further exemplary embodiments, the means 7 is a metal coil (FIG. 3b) and a grid or screen (FIG. 3c). The holes 9 which are present in these exemplary embodiments have a diameter of approximately 2 mm. The body 6 and the exhaust gas 1 are also in contact via these openings 9.

The following control sequence takes place when the urea is introduced into the exhaust gas 1: the starting point is when the diesel engine is started. This causes the temperature-control means 7 to be heated. At the same time, measurement 201 of nitrogen oxide in the exhaust gas 1 is commenced. A gas sensor 12 for nitrogen oxides, which accelerates the exhaust gas downstream of a catalytic converter 11 for the conversion of ammonia and nitrogen oxides into molecular nitrogen and carbon dioxide, is used to determine a level of nitrogen oxides in the exhaust gas 1. The thermal energy supplied to the body is determined according to this level (step 202). If the level of nitrogen oxides is too high, a heating output of the means 7 is increased. As a result, more thermal energy is supplied to the body comprising the urea. More urea is converted into ammonia, leading to a fall in the level of nitrogen oxides in the exhaust gas 1. If the recorded level of nitrogen oxides falls below a certain level, the heating output is reduced. This prevents too much ammonia from being introduced into the exhaust gas and therefore prevents the environment from being polluted with ammonia and also prevents reducing agent from being wasted.

In a further exemplary embodiment, a further gas sensor 13, which determines a level of ammonia in the exhaust gas 1, is present downstream of the catalytic converter 11. If the level of ammonia determined in the exhaust gas is too high, the thermal energy supplied to the body 6 is reduced.

In addition, the various exemplary embodiments of the device 2 have a means for monitoring a quantity of starting material which is present. This means is a light barrier which has a light-emitting photodiode 14 and a photodetector 15 which records the light. The body 6 is arranged between photodiode 14 and photodetector 15, so that it is optically accessible for the light barrier. As soon as starting material is converted into reducing agent, a height 16 of the body 6 falls. If the height 16 falls below a level given by the arrangement of the light barrier and the temperature-control means 7, a signal is generated which notifies the operator that the quantity of starting material present has fallen below a defined level.

What is claimed is:

1. A method for introducing at least one gaseous reducing agent for a nitrogen oxide into a gas mixture, comprising the steps of:

generating said gas mixture;

exhausting said gas mixture into a pipe;

placing a temperature control device into said pipe;

placing at least one solid starting material directly onto said temperature control device;

supplying thermal energy to a body of said at least one solid starting material, so as to form the at least one gaseous reducing agent; and bringing the reducing agent and the gas mixture into contact with one another in said pipe.

2. The method as claimed in claim 1, in which the thermal energy is provided by the temperature control device.

3. The method as claimed in claim 1, in which the thermal energy is provided by the gas mixture (1).

4. The method as claimed in claim 1, in which a surface (61) of the body (6) at which the formation of the reducing agent takes place and the gas mixture are brought into contact with one another.

5. The method as claimed in claim 2 in which the temperature control device acts as a catalyst for the formation of the reducing agent.

6. The method as claimed in claim 1, in which use is made of a starting material from which a reducing agent which has at least one nitrogen atom is formed.

7. The method as claimed in claim 6, in which use is made of a starting material from which ammonia is formed.

8. The method as claimed in claim 6, in which urea is used as starting material.

9. The method as claimed in claim 1, in which a body (6) made from a compacted starting material is used.

10. The method as claimed in claim 1, in which the quantity of starting material present is monitored.

11. The method as claimed in claim 1, in which the body (6) is pressed against the temperature control device.

12. The method as claimed in claim 1, in which the level of nitrogen oxide in the gas mixture (1) is measured, and a quantity of thermal energy which corresponds to this level is supplied to the body.

13. The method as claimed in claim 1, in which the gas mixture (1) used is an exhaust gas from an internal-combustion engine (19).

14. A device for introducing at least one gaseous reducing agent for a nitrogen oxide into a gas mixture, comprising:
   a body made from at least one solid starting material to which thermal energy is supplied to form the at least one gaseous reducing agent; and
   a means for controlling the temperature of the body arranged against the body.

15. The device as claimed in claim 14, in which the temperature-control means (7) has a resistance heating element.

16. The device as claimed in claim 14, in which the temperature-control means (7) has at least one opening (9) for introducing the reducing agent into the gas mixture (1).

17. The device as claimed in claim 14, in which the temperature-control means (7) has at least one coil.

18. The device as claimed in claim 14, in which the temperature-control means (7) has at least one grid.

19. The device as claimed in claim 14, in which the temperature-control means (7) is inert with respect to the starting material and/or the reducing agent.

20. The device as claimed in claim 14, in which there is a means (14, 15) for monitoring the amount of starting material which is present.

21. The device as claimed in claim 20, in which the means (14, 15) for monitoring the amount present has a light barrier.

22. A device for introducing at least one gaseous reducing agent for a nitrogen oxide into a gas mixture, comprising:
   an exhaust pipe having an opening;
   a solid starting material in said opening to which thermal energy is supplied to form at least one gaseous reducing agent; and
   a temperature control device in said opening and directly supporting said solid starting material.

23. The device as claimed in claim 22 further comprising a catalytic converter in said exhaust pipe downstream of said opening, in a direction of exhaust flow.

24. The device as claimed in claim 22 further comprising at least one of a nitrogen oxide sensor and an ammonia gas sensor downstream of said opening, in a direction of exhaust flow.

25. The device as claimed in claim 22 further comprising a photodetector for detecting a quantity of said solid starting material.

26. The device as claimed in claim 22, wherein the opening is enclosed by a vessel such that the opening is at one end of the vessel and a cover is at another end of the vessel.

27. The device as claimed in claim 22, wherein the temperature control device comprises a substantially planar body having a plurality of holes therethrough, such that the gas mixture and the solid starting material are in contact through said plural holes.

* * * * *